United States Patent [19]
Corbin et al.

[11] Patent Number: 4,685,488
[45] Date of Patent: Aug. 11, 1987

[54] BALL VALVE

[75] Inventors: Susan E. Corbin, Mentor; Cal R. Brown, Euclid; David W. Crozier, Mayfield Heights; Peter C. Williams, Cleveland Heights, all of Ohio

[73] Assignee: Whitey Co., Highland Hts., Ohio

[21] Appl. No.: 827,104

[22] Filed: Feb. 7, 1986

[51] Int. Cl.$^4$ .............................................. F16K 27/06
[52] U.S. Cl. ................................... 137/328; 251/171; 251/174; 251/317
[58] Field of Search ............... 251/171, 174, 184, 315, 251/317, 214; 137/328

[56] References Cited

U.S. PATENT DOCUMENTS

| | | | |
|---|---|---|---|
| 3,041,036 | 6/1962 | McFarland | 251/315 X |
| 3,108,779 | 10/1963 | Anderson | 251/184 X |
| 3,223,111 | 12/1965 | Anderson | 251/317 X |
| 3,236,495 | 2/1966 | Buchholz | 251/171 |
| 3,472,270 | 10/1969 | Masheder | 251/315 X |
| 4,026,516 | 5/1977 | Matousek | 251/214 |
| 4,540,012 | 9/1985 | Bridges | 251/214 X |

Primary Examiner—Harold W. Weakley
Attorney, Agent, or Firm—Fay, Sharpe, Beall, Fagan, Minnich & McKee

[57] ABSTRACT

A ball valve comprising a housing having a cylindrical bore extending inwardly from the exterior and defining a valve chamber with inlet and outlet passages connected from the exterior of the housing to the chamber. A ball valve member is positioned axially in the chamber and has a cylindrical operating stem extending axially of the bore into a position exterior of the housing. Positioned within the chamber is a mass of resilient packing material which surrounds the ball and substantially fills the chamber. Adjustable means are provided for applying a compressive load to the packing to cause it to sealingly engage the inner walls of the chamber and the exterior of the ball member. The adjustable means include a rigid circular gland member closely received in the bore and extending transversely thereof in engagement with the packing. A circular opening in the gland member closely surrounds the operating stem and disk spring means are positioned on the gland member on the side opposite the packing. Closely received in the bore outwardly of the disk spring means is a packing nut having an inner surface engaging the disk spring means. Means are associated with the packing nut and the bore for adjustably moving the packing nut member toward the packing gland to compress the disk spring means and apply a biasing force to the packing.

1 Claim, 3 Drawing Figures

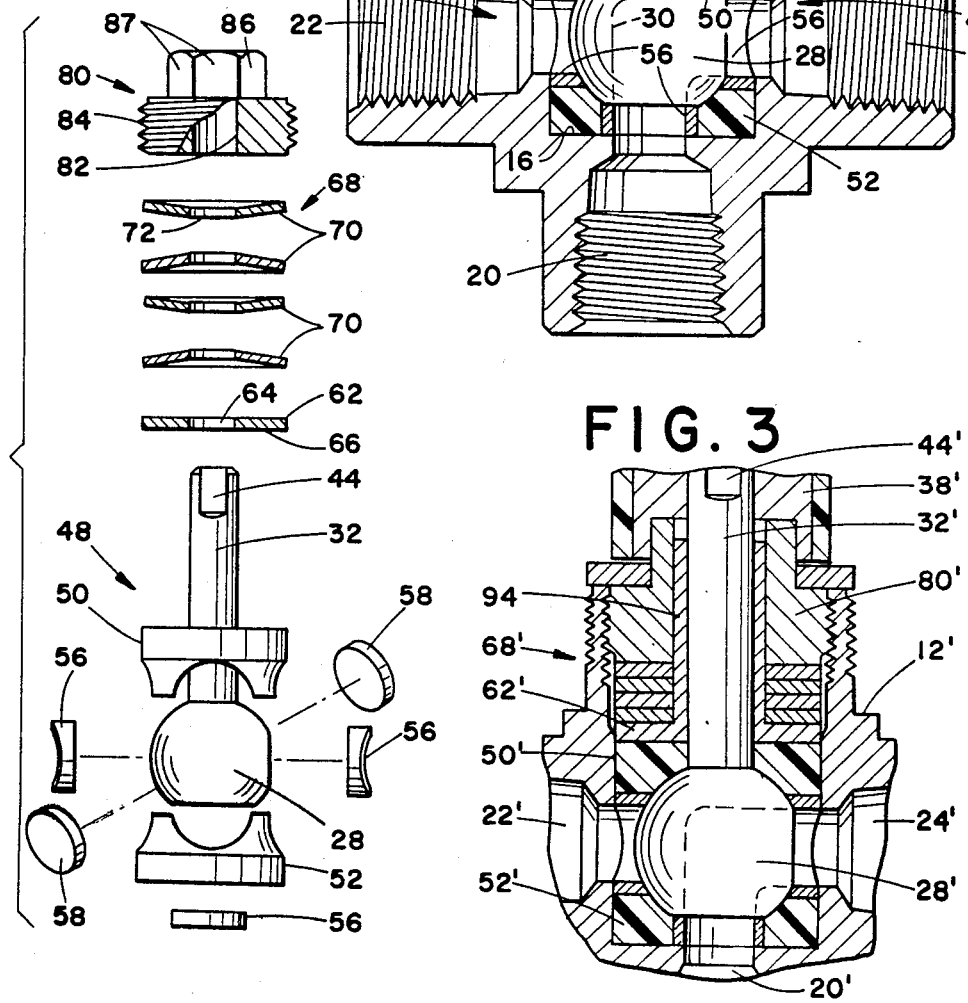

BALL VALVE

BACKGROUND OF THE INVENTON

The subject invention is directed to the valve art and, more particularly, to an improved ball valve construction.

The invention is particularly suited for use in small size ball valves used in control systems and the like and will be described with reference thereto; however, as will become apparent, the invention is capable of broader application and can be incorporated in ball valves of a variety of sizes used for many different purposes.

In commonly assigned U.S. Pat. No. 4,026,516 there is disclosed a ball valve structure of the type wherein the flow controlling ball is enclosed in a cartridge or capsule of a suitable resilient packing material such as polytetrafluoroethylene or polyethylene. A compressive preloading is applied to the packing material to produce fluid sealing between the ball surface and the inner walls of the valve chamber.

In the noted patent, the compressive preloading is applied through a novel stem packing and guide bushing arrangement. The arrangement includes a cylinder of resilient packing material surrounding the ball operating stem and confined in a packing gland mounted to act against the ball enclosing cartridge. A preload force is applied to the stem packing which is compressed to thereby cause the gland to act against the ball enclosing cartridge with a spring-like biasing action.

The described arrangment is extremely satisfactory under most operating conditions and in most environments. However, when used under conditions of extreme temperature cycling or when subject to conditions which result in high levels of packing wear, the arrangement does not perform as well as would be desirable.

BRIEF DESCRIPTION OF THE INVENTION

The subject invention overcomes the noted problems and provides a cartridge preloading system which can handle extreme temperature cycling and high levels of cartridge wear without requiring readjustment or replacement of the cartridge.

In accordance with one aspect, the invention provides a ball valve which includes a housing having a cyclindrical bore extending inwardly from the exterior of the housing to define a valve chamber with inlet and outlet passages connected from the exterior of the housing to the chamber. The ball valve member is positioned axially of the chamber and has a cylindrical operating stem extending axially outwardly of the chamber to a position exteriorly of the housing. Positioned within the chamber is a mass of resilient packing material which surrounds the ball and substantially fills the chamber. Adjustable means are provided for applying a compressive load to the packing to cause it to sealingly engage the inner walls of the chamber and the exterior of the ball member. The adjustable means include a rigid circular gland member closely received in the bore and positioned to extend transversely thereof. The gland member is mounted in direct engagement with the packing and a circular opening in the gland member surrounds the operating stem. Disk spring means are positioned on the gland member on the side opposite the packing. Closely received in the bore outwardly of the disk spring means is a packing nut having an inner surface engaging the disk spring means. Means are associated with the packing nut and the bore for adjustably moving the packing nut member toward the gland member to compress the disk spring means and apply a biasing force to the packing.

In accordance with a more limited aspect of the invention, the disk spring means comprise one or more disk spring members stacked between the gland member and the packing nut member and having a central opening which relatively closely receives the operating stem member.

Preferably, and in accordance with a further aspect of the invention, the outer periphery of the disk springs is sized so as to be relatively closely but slidably received in the bore.

A further aspect of the invention contemplates that a cylindrical sleeve member is positioned to extend from the gland member outwardly into the packing nut member and the disk spring members have their inner opening in relatively close engagement with the outer surface of the sleeve member.

By the use of the described arrangement, the packing is loaded in a manner which compensates for packing wear and also compensates for expansion or contraction of the packing material due to temperature change. The arrangement significantly reduces the frequency with which packing adjustments are required. In addition, by varying the number or stacking arrangement of the disk spring members it is possible to produce wide variations in biasing force or preload without changing the overall configuration and structure of the valve.

Through the use of the described sleeve member it is possible to further vary the size and type of disk springs used without modifying the external or internal valve housing or packing nut configurations. In addition, the sleeve member provides an extremely good disk spring guidance and prevents the disk springs from shifting and/or engaging the operating stem in a deleterious manner.

Accordingly, a primary object of the subject invention is the provision of a ball valve structure of the general type described which is capable of extended operation between packing adjustments and which can function throughout wide ranges of temperature cycling.

A further object is the provision of a valve of the type described in which the compressive preload on the packing can be readily adjusted from the exterior of the valve.

A still further object is the provision of a packing preload arrangement for an encapsulated type ball valve which allows a wide variety of packing preload forces to be generated without the need for modifying the valve housing or associated components.

BRIEF DESCRIPTION OF THE DRAWINGS

The above and other objects and advantages will become apparent from the following description when read in conjunction with the accompanying drawings wherein:

FIG. 1 is a cross-sectional view of a preferred embodiment of a ball valve incorporating the subject invention;

FIG. 2 is an exploded view showing certain components of the FIG. 1 embodiment; and, FIG. 3 is a partial cross-sectional view similar to FIG. 1 but showing a slightly modified form of the invention.

DETAILED DESCRIPTION OF A PRFERRED EMBODIMENT

Referring more particularly to the drawings whrein the showings are for the purpose of illustrating preferred embodiments of the invention only and not for the purpose of limiting same, FIG. 1 illustrates the overall arrangement of a ball valve incorporating the inventive packing preloading or precompressing structure. Specifically, as illustrated in FIG. 1, the valve 10 comprises a rigid housing 12 having a cylindrical bore 14 which extends inwardly from the exterior of the housing and terminates in a flat bottom wall 16. Preferably, bore 14 is of constant diameter throughout its length. The lower end portion (as viewed in FIG. 1) of bore 14 defines a valve chamber 18.

In the subject embodiment, the valve is shown as a three-way valve and includes a first port or passageway 20 and an aligned pair of ports 22 and 24. inlet port 20 is shown as axially aligned with the bore 14. Ports 22, 24 are formed in alignment with their axes intersecting the axis of bore 14. Each of the ports 20, 22 and 24 are provided with conventional connecting means, such as pipe threads, for permitting the valve to be suitably attached to pipe, tube fittings, or the like.

While the valve is illustrated as a three-way valve, it should be apparent that the invention could be incorporated in two-way, vented, or multi-port valves, and that the particular valve body style forms no part of the invention.

Mounted axially within the valve chamber portion of bore 14 is a ball valve member 28 provided with a suitable internal passage 30 located such that port 20 can be connected with ports 22 or 24 by selective rotation.

In the embodiment shown, ball valve element 28 includes an integral, generally cylindrical operating stem or shaft 32 which extends from the ball axially of bore 14 to a position exteriorly of the housing 12. A suitable handle 36 is mounted at the outer end of the stem 32 and provides means for selective rotation of the ball valve element 28. In the embodiment under consideration, handle 36 is molded from a suitable plastic and includes a molded in metal insert member 38 having an internal bore 40 which receives the outer end of stem 32. A setscrew or the like 42 is provided for engaging a flat 44 formed on the outer end of stem 32 and locking the handle in its desired relationship with the stem and ball assembly.

Positioned within the valve chamber 18 and closely surrounding the ball member 28 is a cartridge or packing assembly 48 comprising a mass of suitable plastic or resinous material selected to have the desired characteristics for the environment which the valve is expected to encounter. Typically, for example, plastic materials such as polytetrafluoroethylene and polyethylene are used for the ball packing in valves of the type under consideration. Generally, and as described more fully in U.S. Pat. Nos. 3,236,495 and 4,026,516, the disclosures of which are herein incorporated by reference, the packing assembly 48 is formed as cooperating upper and lower halves 50, 52 (see FIG. 2). Each of the two packing halves have generally cylindrical outer surfaces adapted to fit closely within bore 14 and inwardly extending hemispherical surfaces to closely engage the outer surface of ball member 28. Additionally, the upper packing half 50 includes an axially aligned opening 54 sized to closely engage about the stem 32. Suitable rings 56 formed of metal or rigid plastic are associated with the packing and are positioned about the various inlet and outlet ports to prevent extrusion of the packing material into the port area. Additioally, as described in the aforementioned U.S. Pat. Nos. 3,236,495 and 4,026,516, rigid disks 58 are preferably positioned on diametrically opposite sides of the ball valve member 28 and extend from the ball through the packing 48 into engagement with the walls of the valve chamber 18 to prevent packing extrusion into the ball passage 30 when the valve is in an off position. it should be appreciated that the arrangement of the rings and disks would vary depending upon the porting arrangement used.

Of particular importance to the subject invention is the means provided to apply a compressive preload to packing 48 to maintain the packing in sealing engagement with the outer surface of the ball member 28 and the interior surface and lower wall of the bore 14. In the subject embodiment, this means includes a generally flat, relatively rigid, circular disk or gland member 62 having an outer diameter size such that it is closely but freely received within bore 14. A central opening 64 extends axially through disk 62. Opening 64 is sized so as to be slidably received on stem 32. As can be appreciated, disk 62 could be formed of a variety of materials having suitable strength characteristics; however,in the subject embodiment the disk is preferably formed of metal.

As shown, disk 62 is positioned with its lower surface 66 in engagement with the top surface of packing member 50. Carried on the opposite side of disk 62 is disk spring means 68. In the embodiment illustrated, disk spring means 68 comprises one or more metallic spring washer members 70 which have a generally dish shaped configuration their unstressed condition as shown in FIG. 2. As will become apparent, the number and stacking arrangement of the metallic disk spring members 70 can be varied to suit the needs of the particular valve involed. In the subject embodiment, four of the metallic disk spring members 70 are illustrated and they are positioned in alternating facing relationship, as shown in FIG. 2.

It should be noted that the disk spring members 70 have an internal opening 72 which is only slightly larger than the diameter of stem 32. This assures that the spring members are properly guided and maintained in their desired stacked relationship relataive to the gland member 62. In addition, the outer diameter of the disk spring member 70 is preferably only slightly less than the internal diameter of the bore 14. This assures additional guidance of the disk members.

Positioned at the outer end of bore 14 and arranged to be adjustably moved toward and away from the gland member 62 is a nut member 80. An axial opening 82 extends through nut member 80 for freely and slidably receiving the stem 32. Means in the form of cooperating threads 84 are formed on the exterior of nut member 80 and the interior of the outer end of bore 14 to provide means for adjustably moving nut member 80 to compress the disk springs 70 and apply an adjustable compressive preload through gland 62 to packing 48.

As best shown in FIG. 2, the upper end of packing nut 80 is provided with a reduced diameter portion 86 provided with suitable tool receiving surfaces such as wrench flats 87. The reduced diameter portion preferably extends outwardly of the body for convenient access for adjustment purposes. As shown, the handle insert 38 includes a counterbore 88 which closely receives the reduced diameter portion 86 of the packing nut 80. A suitable stop key or stop plate 90 is positioned on the outer end of bore 14 and includes an opening through which the reduced diameter portion 86 of nut member 80 passes. The member 90 serves to engage stops (not shown) on handle 36 and housing 12 at suitable alternative positions of stem 32 and valve 28.

FIG. 3 illustrates a slightly modified form of the invention. In the FIG. 3 showing the same reference numerals in the FIG. 1 embodiment have been used to identify the corresponding components. The FIG. 3 numerals are differentiated, however, from those of FIG. 1 by the addition of a prime suffix. Unless otherwise noted, commonly identified FIG. 3 components are identical to those discussed with reference to the FIG. 1 embodiment. In the FIG. 3 embodiment an elongated cylindrical sleeve member 94 extends from gland 62' upwardly through the disk spring means 68' and the nut member 80'. The internal diameter of sleeve 94 is sized to closely but slidably engage the outer surface of stem 32'. The outer diameter is sized so as to closely receive the inner diameter of the disk spring member 70' and nut member 80'. Preferably, and as shown in FIG. 3, sleeve 94 is integral with the gland 62'; however, as can be appreciated, it could be a separate element if desired. The sleeve member 94 acts as a guide for the spring members 70' and, further, prevents them from engaging the operating stem 32'. Through the use of the guide sleeve 94 a wider variety and selection of disk spring members can be incorporated in the valve and/or the same springs can be used for a range of valve sizes.

As can be seen from the foregoing, the subject invention provides an extremely simple and compact arrangement for preloading the packing in a manner which readily compensates for wear and expansion or contraction of the packing due to temperature change or cycling. In addition, the preload can be readily varied without disassembling or removing the valve from the line.

The invention has been described in great detail sufficient to enable one of ordinary skill in the art to make and use the same. Obviously, modifications and alterations' of the preferred embodiment will occur to others upon a reading and understanding of the specification. It is our intention to include all such modifications and alterations as part of our invention insofar as they come within the scope of the appended claims.

Having thus described the invention, it is now claimed:

1. A ball valve comprising:
   a housing having a cylindrical bore extending inwardly from the exterior of said housing and defining a valve chamber with inlet and outlet passages connected from the exterior of said housing to said chamber;
   a ball valve member positioned axially of said chamber and having a cylindrical operating stem extending axially of said chamber to a position exterior of said housing;
   a mass of resilient packing material surrounding said ball and substantially filling said chamber; and
   adjustable means for applying a compressive load to said packing to cause it to sealingly engage the inner walls of said chamber and the exterior of said ball member; said adjustable means including a rigid metal circular gland member closely received in said bore and extending transversely thereof in engagement with said packing, a circular opening in said gland member surrounding closely and guided by said operating stem, a plurality of stacked disk springs having a first central opening radially dimensioned. to freely receive and surrounding and guided by said stem in both unstressed and compressed conditions and positioned on said gland member on the side opposite said packing, the outer diameters of said disk springs dimensioned for close receipt in said bore, a packing nut member closely received in said bore outwardly of said disk spring means and having a second central opening freely receiving said stem and an inner surface drivingly engaging said disk springs for applying an adjustable compressive preload to said disk springs, and means for adjustably moving said packing nut member toward said packing gland to compress said disk springs and apply a biasing force to said packing, said means for adjustably moving said packing nut member including cooperating threads formed on said packing nut and said bore and tool engaging surfaces formed on said packing nut.

* * * * *